May 19, 1931.  O. G. GREGSON  1,806,532
SECTIONAL AUXILIARY RIM AND BRACKET FOR VEHICLE WHEELS
Filed July 29, 1929
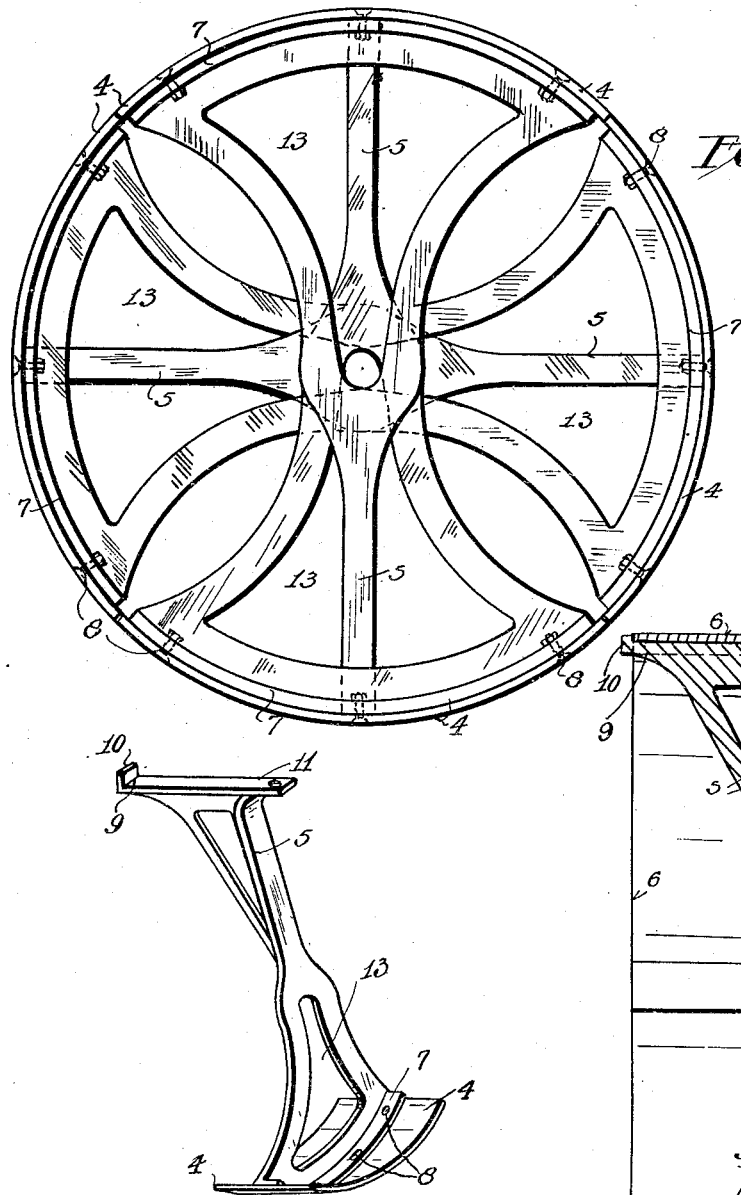
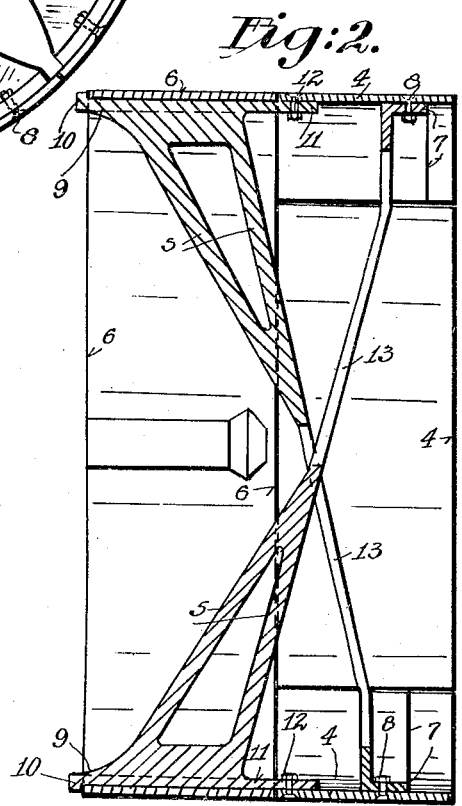
Inventor
Oswald G. Gregson,
by *[signature]*
Attorney.

Patented May 19, 1931

1,806,532

UNITED STATES PATENT OFFICE

OSWALD GORDON GREGSON, OF WEST PERTH, WESTERN AUSTRALIA, AUSTRALIA

SECTIONAL AUXILIARY RIM AND BRACKET FOR VEHICLE WHEELS

Application filed July 29, 1929, Serial No. 381,875, and in Australia June 4, 1929.

The aim of this invention is to provide an efficient auxiliary rim for the existing ground wheels of tractors, automotive and other vehicles in order to extend their bearing surfaces and increase their traction.

By means of this invention such vehicles are enabled to work in soft and yielding ground with a maximum degree of efficiency.

The invention broadly resides in the use of an auxiliary rim made in sections, in conjunction with any number of segmental brackets whereby said rim is secured to the rim of the vehicle wheel.

The number of sections of the auxiliary rim correspond to that of the segmental brackets.

The construction and use of the invention will now be described with the aid of the accompanying drawings wherein Fig. 1 is a side elevation of the invention. Fig. 2 is a sectional view thereof showing the auxiliary rim as secured to the rim of a tractor wheel. In this view, only two brackets are shown and the spokes of the tractor wheel have been omitted for the sake of clearness. Fig. 3 is a perspective view on a reduced scale, of one of said brackets.

Referring to said drawings:—

In conjunction with one or more of the existing ground wheels of a vehicle, I employ a rim which acts as an auxiliary or working extension of the same to provide a maximum bearing surface.

This auxiliary rim is divided into or made in sections as 4, each of which is provided with a segmental bracket (detailed in Fig. 3) the arms 5 of each of which extend into the vehicle wheel 6 and are secured thereto at a locality of the rim of the latter wheel diametrically opposite to that of the corresponding locality of anchorage of the said segmental section to the auxiliary rim. Each bracket of the rim is arcuate as shown in Figs. 1 and 3. Each bracket at its peripheral edge is formed with a flange 7 whereby it is secured to its section as 4 of the auxiliary rim, by means of bolts, studs or by any other approved fastening agent as 8.

The opposite end of the arm 5 of the bracket at its junction with the rim of the ground wheel 6 of the vehicle, is formed with an inwardly extending flange 9 and has an integral snug 10 adapted to grip the inner peripheral edge of said rim of the ground wheel.

On the outer edge of the arm 5 of the bracket is integrally formed an outwardly extending flange 11 adapted to be secured by bolts 12 to the section 4 of the auxiliary rim opposite to that to which the said bracket is anchored. The purpose of said snug 10 and flanges 9 and 11 is to prevent any outward lateral movement of the auxiliary rim 4 and the brackets connected thereto.

A slot or opening 13 is formed in the face of the bracket through which slot is passed the arm 5 of the diametrically oppositely positioned bracket as clearly shown in Figs. 1 and 2.

The arm 5 of each segmental bracket is passed between the spokes of the vehicle wheel.

In the case of the vehicle wheel being of the disc type, slots or openings are formed therein through which are passed the arms of said brackets.

The brackets may be made integral with their sections 4 of the auxiliary rim or separate therefrom and in which latter case they are bolted or otherwise secured thereto as above set forth.

In using the invention in connection with flat rimmed vehicle wheels, the diameter of the auxiliary rim is equal to that of the vehicle wheel, while when the invention is used in connection with wheels having pneumatic or rubber tires, the diameter of the auxiliary rim is preferably reduced.

What I claim as my invention and desire to secure by Letters Patent is:—

1. In combination, a vehicle wheel having a rim, an auxiliary rim formed in sections secured thereto, segmental brackets, said brackets each having at one of its ends an arc-shaped flange secured to a section of the auxiliary rim, the arms of said brackets being passed through openings formed therefor in the oppositely positioned and companion brackets, each of said arms having at its other end a flange extending transversely of the inner periphery of said vehicle wheel rim and secured to one of said auxiliary rim sections and each of the last named flanges bearing against the free edge of said vehicle having a snug projecting therefrom and wheel rim to prevent outward lateral movement of the auxiliary rim.

2. In combination, a vehicle wheel having a rim, an auxiliary rim for the wheel composed of sections, brackets carrying said sections, said brackets being of a length substantially the same as the diameter of the wheel and projecting beyond the auxiliary rim sections and secured to the wheel, the portions of the brackets on one side of the axis of the wheel passing through the portions of the brackets on the other side of said axis.

In testimony whereof I have hereunto set my hand.

OSWALD GORDON GREGSON.